United States Patent
Morton et al.

(10) Patent No.: US 6,636,228 B2
(45) Date of Patent: Oct. 21, 2003

(54) METHOD OF ENSURING ADEQUATE CONTRAST OF GRAPHICAL USER INTERFACE ELEMENTS

(75) Inventors: David Morton, Redmond, WA (US); Greg Lewis, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 09/876,490

(22) Filed: Jun. 7, 2001

(65) Prior Publication Data

US 2002/0186222 A1 Dec. 12, 2002

(51) Int. Cl.$^7$ ................................................ G09G 5/02
(52) U.S. Cl. ........................ 345/589; 345/593; 345/594
(58) Field of Search ................................ 345/589, 593, 345/594

(56) References Cited

U.S. PATENT DOCUMENTS 6,502,045 B1 * 12/2002 Biagiotti ...................... 702/66

OTHER PUBLICATIONS

*Using color in the X Window system versus Microsoft Windows 1*; T. Pavlidis and K. Hunter; *IEEE Computer Graphics and Applications*, Nov.–Dec. 1998, v18, n6 pp.64–73.

*Extrapolating CRT color use research to LCD flat–panel color selection: lessons learned*; A.J. Volanth, D.L. Miller, G.J. Wolfman; *Proceedings of the Human Factors and Ergonomics Society*. 40$^{th}$ *Annual Meeting*; 1996, pp. 10071–011 v2.

*COREMAP–graphical user interface for displaying reactor core data in an interactive hexagonal map*, F.L. Muscat and K.L. Derstine; *Proceedings of the International Conference, Mathematics and Computations, Reactor Physics, and Environmental Analyses*, 1995, pp. 1142–1145 v2.

*An architecture for transforming graphical interfaces*; W. Keith Edwards and Elizabeth D. Mynatt;*Proceedings of the ACM symposium on user interface software and technology*, 1994 39–47.

*Common elements in today's graphical user interfaces (panel): the good, the bad, and the ugly*; A. Brady Farrand, Marc Rochkind, Jean–Marie Chauvet, Bruce Tognazzini and David C. Smith: *Proceedings of the conference on human factors in computing systems*, 1993, pp. 470–473.

* cited by examiner

*Primary Examiner*—Matthew C. Bella
*Assistant Examiner*—Tam Tran
(74) *Attorney, Agent, or Firm*—Merchant & Gould

(57) ABSTRACT

A method and system are provided for ensuring adequate contrast between colors used for graphical user interface elements. Pairs of colors for use in a given pair of graphical user interface elements are compared to determine whether a minimum required contrast exists between the colors. If a determination is made that the contrast between a given pair of colors is less than the minimum required contrast, one of the colors is designated as locked and the other color is designated as moveable. The moveable color is moved toward white or black to increase the relative brightness intensity and thereby increase the contrast between the moveable color and the locked color. Once the required minimum contrast is met or exceeded, the color pairing may be used for rendering a given graphical user interface element. After a color is designated as locked for a particular graphical user interface, that color for that interface remains locked when or if it is subsequently compared against a different graphical user interface element. After a color has been designated as moveable and has been moved to enhance contrast between two graphical user interface elements, that color for that graphical user interface element is locked from subsequent movement.

31 Claims, 13 Drawing Sheets

METHOD OF ENSURING ADEQUATE CONTRAST OF GRAPHICAL USER INTERFACE ELEMENTS

TECHNICAL FIELD

The present invention generally relates to presentation of colors. More particularly, the present invention relates to ensuring adequate contrast between colors used in graphical user interface elements.

BACKGROUND OF THE INVENTION

In recent years, the use of graphical user interfaces for the display of information on computer monitors has increased dramatically. With that increase, developers of computer operating systems and computer software applications have sought to implement a variety of color schemes for the presentation of computer rendered information that will be pleasing to the user, avoid user fatigue, such as eye strain, and that allow the user to quickly find and utilize graphically displayed functional elements, such as buttons, toolbars and control boxes.

In deciding appropriate colors for use for rendering graphical user interface elements such as buttons, toolbars and control boxes, software developers often must select pairings of colors that will be displayed adjacent to each other as adjacent graphical user interface elements. For example, a developer of a word processing application may desire to place certain button text against a button background on a tool bar located above a text entry area. In order to make the button text useful to the user, it is desirable that the button text be colored such that a sufficient amount of contrast exists between the color of the button text and the color of the button background. Only with sufficient contrast will the user be able to readily distinguish the button text from the background color of the button. If the contrast between the button text and the button background is insufficient, the user may not readily read the button. Also, the user may develop fatigue from trying to read the button text, or the user may simply be annoyed at the lack of sufficient contrast between the button text and the button background.

Other exemplary contrast issues include maintaining sufficient contrast between the text of a disabled button and the background color of the button in which the text is located such that on the one hand the user may readily determine that the button is disabled, and on the other hand the text of the button does not wash out from view of the user.

Systems have been developed in which standard sets of colors are preset at the operating system level and software application level to ensure that an adequate degree of contrast between those sets of colors exist. However, such systems do not account for the desires of developers and users to modify individual colors without adversely affecting the contrast between that color and any other colors in the set. And, manually adjusting one color relative to another color often adversely affects the hues of the color. For example, adjusting the color blue may make the color blue appear purple.

It is with respect to these considerations and others that the present invention has been made.

SUMMARY OF THE INVENTION

In accordance with the present invention, the above and other problems are solved by a method and system for ensuring adequate contrast between the colors used for displaying graphical user interfaces. Pairs of colors for use in graphical user interface elements are compared to determine whether a minimum required contrast exists between the colors. If a determination is made that the contrast between a given pair of colors is less than the minimum required contrast, one of the colors is designated as locked and the other color is designated as moveable.

The moveable color is moved toward white or black to increase the relative contrast between the moveable color and the locked color. Once the required minimum contrast is met or exceeded, the color pairing may be used for rendering graphical user interface elements. Once adequate contrast is achieved, the colors of the two graphical user interfaces thus compared are locked from subsequent change when fixing contrast between one of those elements and a third element.

More particularly, a determination is made whether the contrast between the first color and the second color of a pair of graphical user interface elements is equal to or greater than the minimum contrast, and if the contrast is not equal to or greater than the minimum contrast, the first color is designated as locked, and the second color is designated as moveable. If the moveable color is closer to the color black than the locked color, the moveable color is moved closer to the color black until the contrast between the first color and the second color is equal to or greater than the minimum contrast. However, if the moveable color is closer to the color white than the locked color, the moveable color is moved closer to the color white until the contrast between the first color and the second color is equal to or greater than the minimum contrast. Once a pair of colors has been processed neither color of that pair may be moved in the future, and both must be considered locked for any future calculations.

According to another aspect, a maximum contrast is set for the first color and the second color. A determination is made whether the contrast between the first color and the second color exceeds the maximum contrast. If the contrast between the first color and second color exceeds the maximum contrast, the first color is designated as locked and the second color is designated as moveable. The moveable color is moved closer to the locked color until the contrast between the locked color and moveable color is less than or equal to the maximum contrast.

Alternatively, a computer readable medium is provided which stores computer executable instructions which when executed by a computer ensure adequate contrast between colors of graphical user interfaces as described above.

These methods may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE INVENTION

In an exemplary embodiment of the present invention, a method and system are provided for ensuring adequate contrast between colors utilized for rendering graphical user interface elements. The present invention may be understood more readily by reference to the following detailed description of the invention and the drawings.

Figure 1:
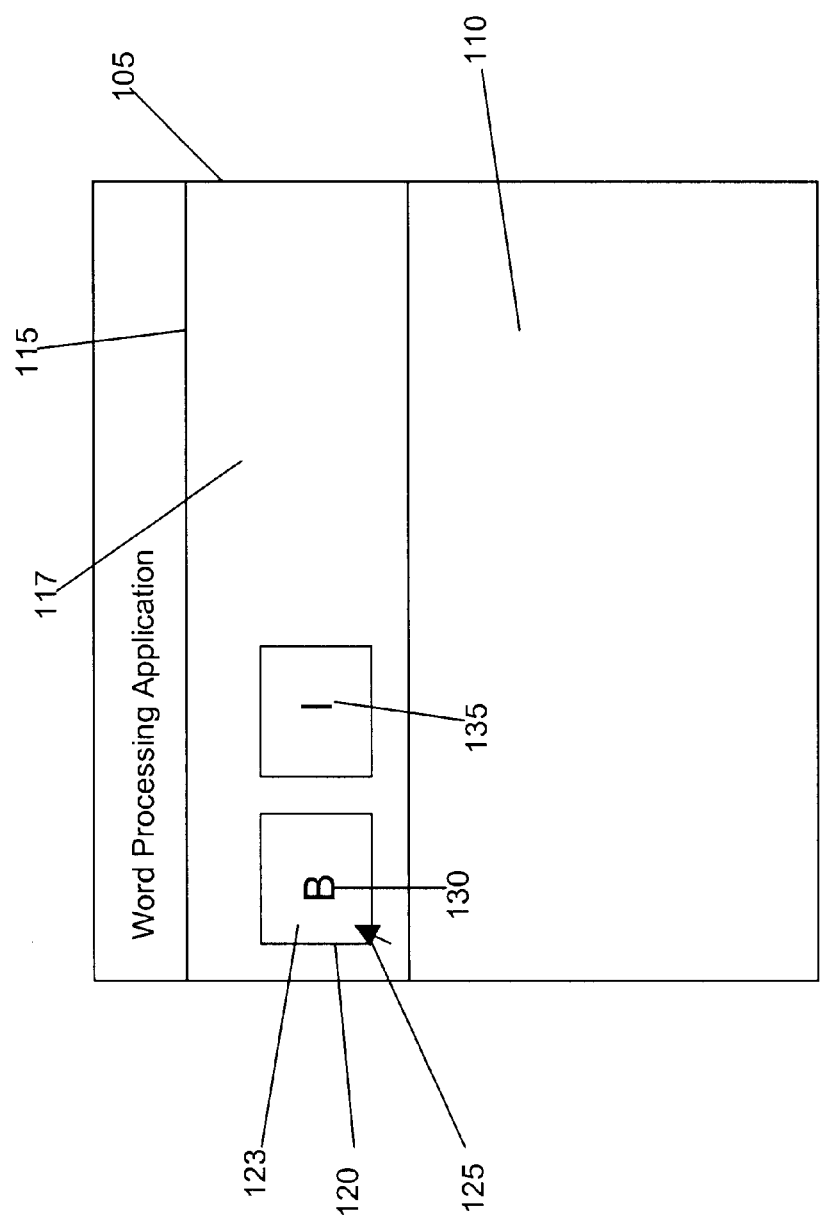
FIG. 1 depicts a screen shot of an exemplary computer rendered graphical user interface according to an exemplary embodiment of the present invention.

FIG. 1 depicts a screen shot of a computer rendered graphical user interface such as may be found in an exemplary word processing program. An exemplary word processing program is Microsoft Word manufactured by Microsoft Corporation of Redmond, Wash. The exemplary window frame 105 includes a text to input area 110, a toolbar area 115, and a series of buttons 120 and 135. The toolbar area 115 includes a background color 117 that forms a border about the buttons 120, 135. The button 120 includes a background color 123 and a text character "B" 130. A second button 135 is illustrated adjacent to the button 120. Additionally, a mouse pointer 125 is illustrated hovering over the button 120. According to an exemplary embodiment of the present invention, a computer software application 100, such as a word processor, upon command renders the window frame 105 as illustrated in FIG. 1.

As is well known to those skilled in the art, prior to rendering the window frame 105 illustrated in FIG. 1, a determination is made either by the developers of the software application 100 or by the user of the software application 100 as to what colors will be used for each of the elements of the graphical user interface comprising the window frame 105.

According to an exemplary embodiment of the present invention, prior to ran time of a given computer software application 100, a table of graphical user interface elements, with corresponding colors thereof, is created for use by the software application for rendering graphical user interface elements such as those illustrated in FIG. 1. The colors used for the graphical user interface elements may be selected from the color set of the computer's operating system or the colors may be created by blending colors provided by the computer's operating system.

The colors selected for the graphical user interface elements may be used by the application 100 to distinguish features of graphical user interface elements. For example, the background color 123 of a button, such as button 120 of a word processing application, may be colored blue while the color of the border 117, about the button 120, may be colored green. In accordance with an exemplary embodiment of the present invention, selected pairs of graphic user interface elements can be designated as requiring a minimum contrast between their associated colors.

A determination is made whether each pair selected by the computer software application 100 has the required minimum contrast. As described in detail below, for any pair of colors that does not have the required minimum contrast between the colors comprising the pair, one of the two colors is moved closer to white or black in order to increase the contrast between the two colors, but without adversely changing the relative hues of the colors. In an alternative embodiment of the present invention, a determination may be made whether the two colors comprising a given pair of colors exceeds a maximum required contrast. In that case, contrast between the two colors may be decreased by moving one of the colors toward the other color in terms of hue.

Once the color of a given graphical user interface element is designated as locked, the color of that graphical user interface is kept locked and is not moved in the future relative to the color of another graphical user interface element. For example, if the first color pairing analyzed in accordance with the present invention is associated with the button text 130 and the button background 123, respectively, the color of one of the two graphical user interface elements is designated as locked and the other is designated as moveable if the contrast between the two elements must be increased or decreased. If the color of the button background 123 is marked as locked and the color for the button text 130 is marked as moveable, the color of the button text 130 may be moved in accordance with the present invention to increase the contrast between the color of the button background 123 and the button text 130.

However, in a subsequent analysis of the contrast between the colors comprising two graphical user interface elements where the button background 123 is compared against a different graphical user interface element color such as the background color 117 of toolbar 115, the color of the button background 123 will remain locked in the comparison against the background 117. Otherwise, if the color of the button background 123 is moved, the contrast between the button background 123 and the button text 130 that was modified earlier will be altered, perhaps in an unsatisfactory manner. Additionally, after a color designated as moveable for any graphical user interface element is moved once to enhance the contrast between that element and another element, the color of that graphical user interface element is then locked from movement in any subsequent comparison. Accordingly, once the color of a given graphical user interface element is designated as locked, that color remains locked, and once the color of a given graphical user interface element is moved, that color is locked in the new location from movement in subsequent color comparisons.

Figure 2:
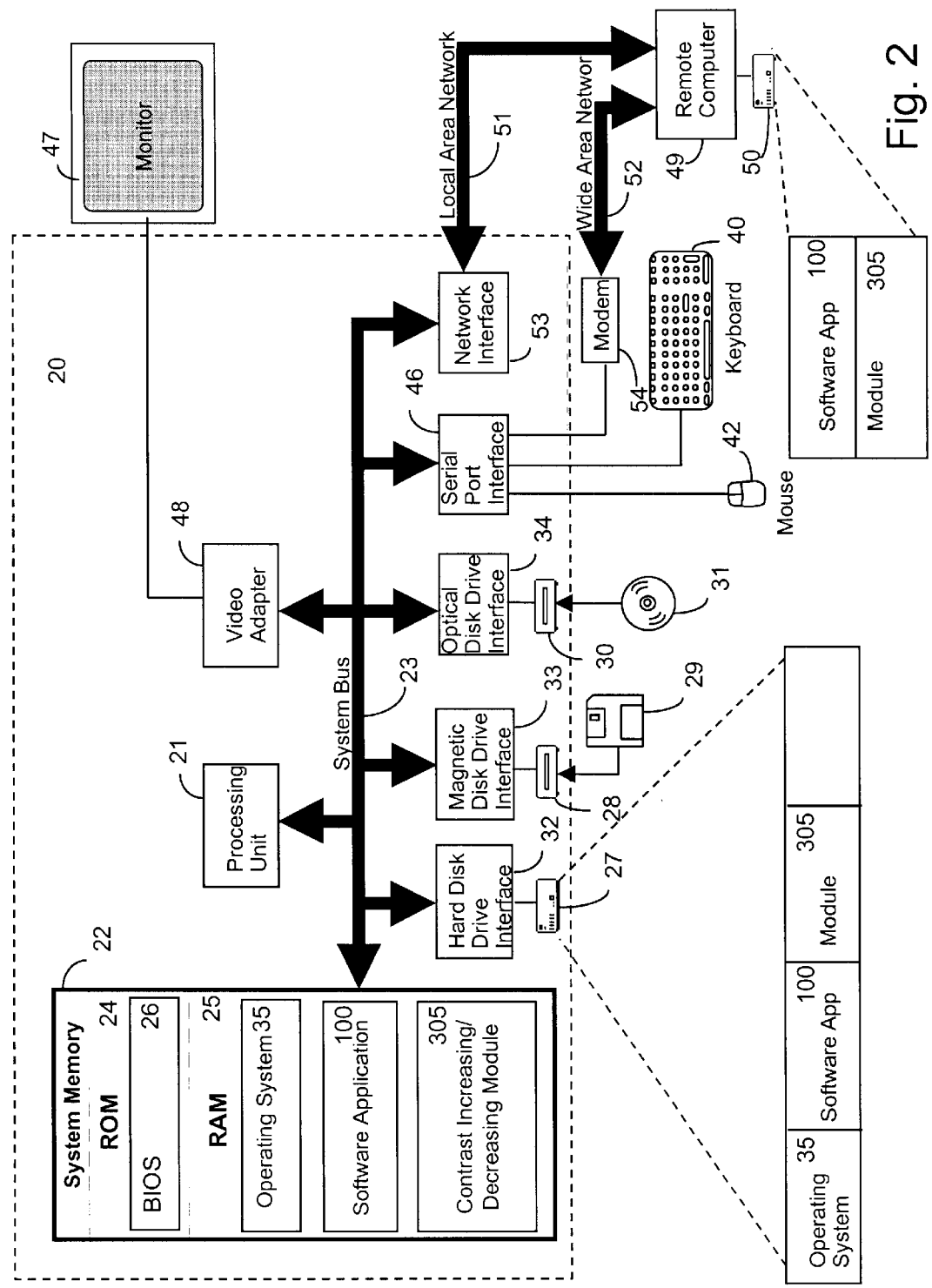
FIG. 2 illustrates a computer system that provides an operating environment for an exemplary embodiment of the present invention.

FIG. 2 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, a software application 100, and a Contrast Increasing/Decreasing module 305. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers 49. The remote computer 49 may be a server, a router, a peer device or other common network node, and typically includes many or all of the elements described relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Computing devices, such as personal computer 20, typically include at least some form of computer readable media. Computer readable media can be any available media that can be accessed by personal computer 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by personal computer 20.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Computer readable media may also be referred to as computer program product.

Figure 3:
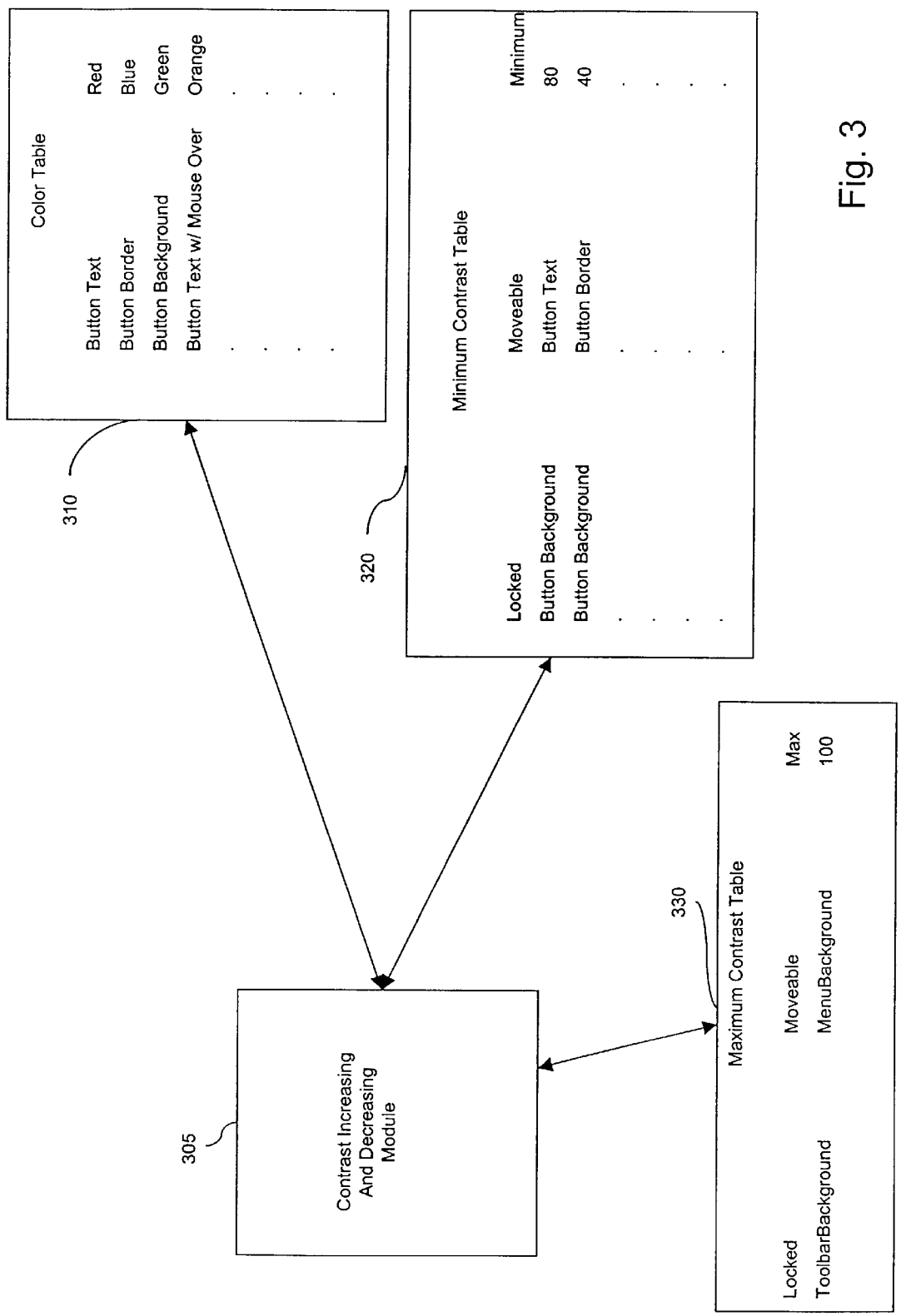
FIG. 3 shows a functional block diagram illustrating interaction between a contrast increasing/decreasing module, a color table, a minimum contrast table of pre-selected graphical user interface element pairings, and a maximum contrast table pre-selected graphical user interface element pairings.

FIG. 3 shows a functional block diagram illustrating interaction between a contrast increasing/decreasing module 305, a color table 310, a minimum contrast table of pre-selected graphical user interface element pairings 320, and a maximum contrast table pre-selected graphical user interface element pairings 330. According to an exemplary embodiment, the contrast increasing/decreasing module 305 is a program module called upon by the software application 100 to compare and adjust, if necessary, the contrast between colors comprising the pairs of graphical user interface elements contained in table 310.

As set forth above, at run time of the computer software application 100, a color table 310 is created containing every graphical user interface element and corresponding color to be used by the software application 100 for rendering graphical user interface elements and text. Each of the colors represent some component of the user interface, for example, a "Command Bar Button Background With Mouse Over" which is the color of the background of the command bar button while the mouse pointer 125 is hovering over it, such as the button 120, illustrated in FIG. 1.

Referring to FIG. 3, according to an exemplary embodiment, the color table 310 maps graphical user interface elements to actual colors. In the exemplary form illustrated in FIG. 3, the table has two columns, including an elements column and a corresponding colors column. When the application 100 needs to draw an element, it queries the color table 310 for the appropriate color to use. The table is initialized when the application starts, and the appropriate color for each of the elements is calculated through a combination of existing operating system colors and blends between colors created by developers of the software application 100.

The maximum contrast table 320 contains three columns, including "Locked," "Moveable" and "Minimum" (minimum desired contrast between locked element and the moveable element). According to a preferred embodiment, the table 320 is prepared by the developers of the software application. As shown in FIG. 3, the actual colors (e.g., "green") do not appear in this table. But, the first two columns represent references to the colors found in the color table 310. At a starting point, the colors in the color table 310 are populated with colors from the computer operating system, and then processing of the present invention is utilized via the minimum contrast table 320 to ensure the colors in the color table 310 have requisite contrast between given pairs of graphical user interfaces.

To process the colors in the color table 310, the contrast increasing/decreasing module 305 obtains the "locked" color by taking the first element of the minimum contrast table 320 and uses it as an index into the color table 310. For example, the first element in table 320 is "Button Background", and the color table 310 designates the color blue for the "Button Background." Accordingly the first locked color is blue. Next, the contrast increasing/decreasing module 305 obtains the "moveable" color by taking the second element of the minimum contrast table 320 and uses it as an index into the color table. For example, the second element in the table 320 is "Button Text", and the color table designates the "Button Text" as red. Accordingly, the first moveable color is red.

The contrast increasing/decreasing module 305 next obtains the minimum contrast value from the minimum contrast table 320 for the two elements. If the contrast between the colors of the two elements is less than the minimum value, the contrast increasing/decreasing module 305 will alter the moveable color as described below so that the minimum contrast is reached or exceeded. For example, the color red may be made lighter toward the color pink. After processing is finished the color table 310 is updated to reflect the changes in the color pairing. After the color table 310 is updated, those two colors for those two elements are locked form subsequent alteration.

The maximum contrast table 330 contains maximum contrast values between graphical user interface elements and operates similarly to the operation of the minimum contrast table 320. Operation of the maximum contrast table 330 is discussed below with reference to FIG. 9.

Figure 4:
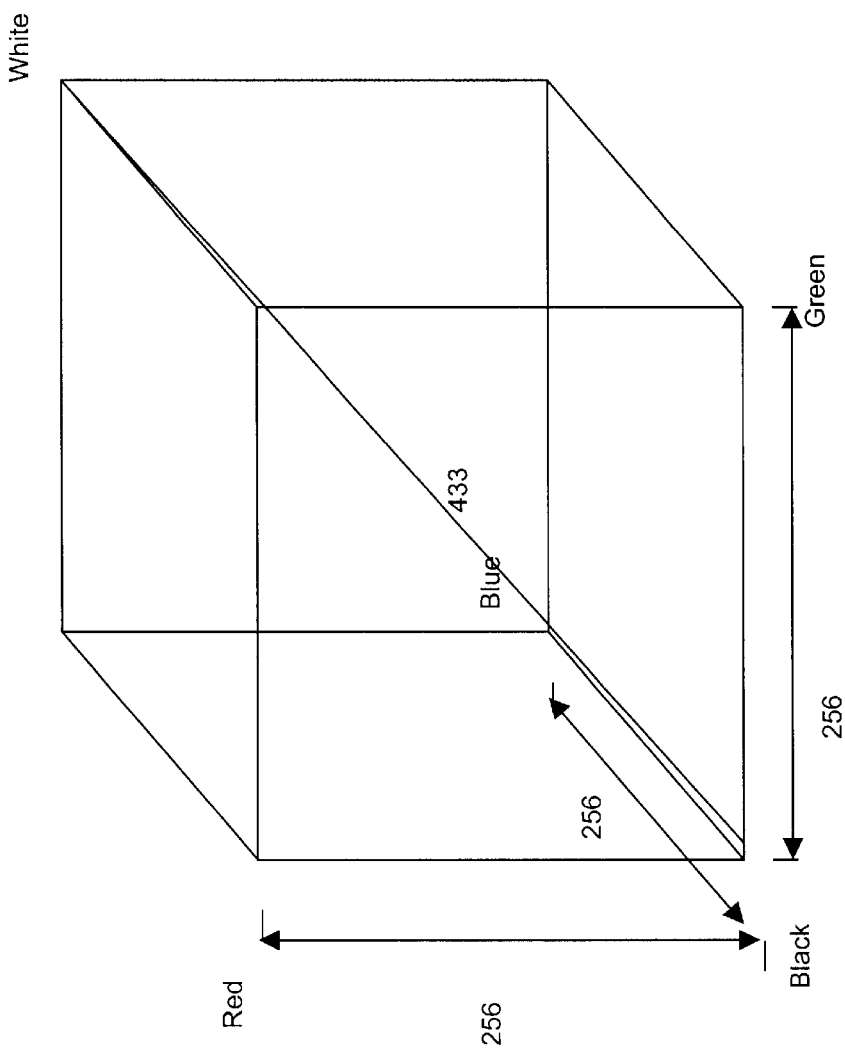
FIG. 4 depicts a simplified block diagram illustrating the relationship between the colors red, green and blue in a typical red, green, blue color model.

In accordance with a preferred embodiment of the present invention, color processing is done using known red/green/blue triplets to represent colors. FIG. 4 depicts a simplified block diagram illustrating the relationship between the colors red, green and blue in a typical red/green/blue color model. According to the illustration depicted in FIG. 4, each of red, green and blue are illustrated as different dimensions of a cube where each dimension has 256 possible values. As well known to those skilled in the art, the red/green/blue model describes colors that are produced by emitting light as on a video monitor rather than absorbing it as with ink on paper. By altering the percentages of the colors red, green and blue, those colors may be mixed to create the appearance of any desired color. Adding no color produces black, and adding 100 percent of all three colors produces white.

FIG. 4 illustrates the red/green/blue color model, with 256 values for each color. Under known principles of geometry, the distance between black and white in the geometric representation of the red/green/blue model is approximately 443 units.

The functionality of an exemplary embodiment of the present invention may be utilized where computer generated colors are produced under alternative systems including cyan, magenta and yellow (CMY) models and hue, saturation and brightness (HSB) models. Under the hue, saturation and brightness model, the hue is the color itself, for example red, yellow, green, blue, etc. The saturation is the distance from gray (e.g., the amount of the hue present). The brightness is the distance from black towards white.

Figure 5:
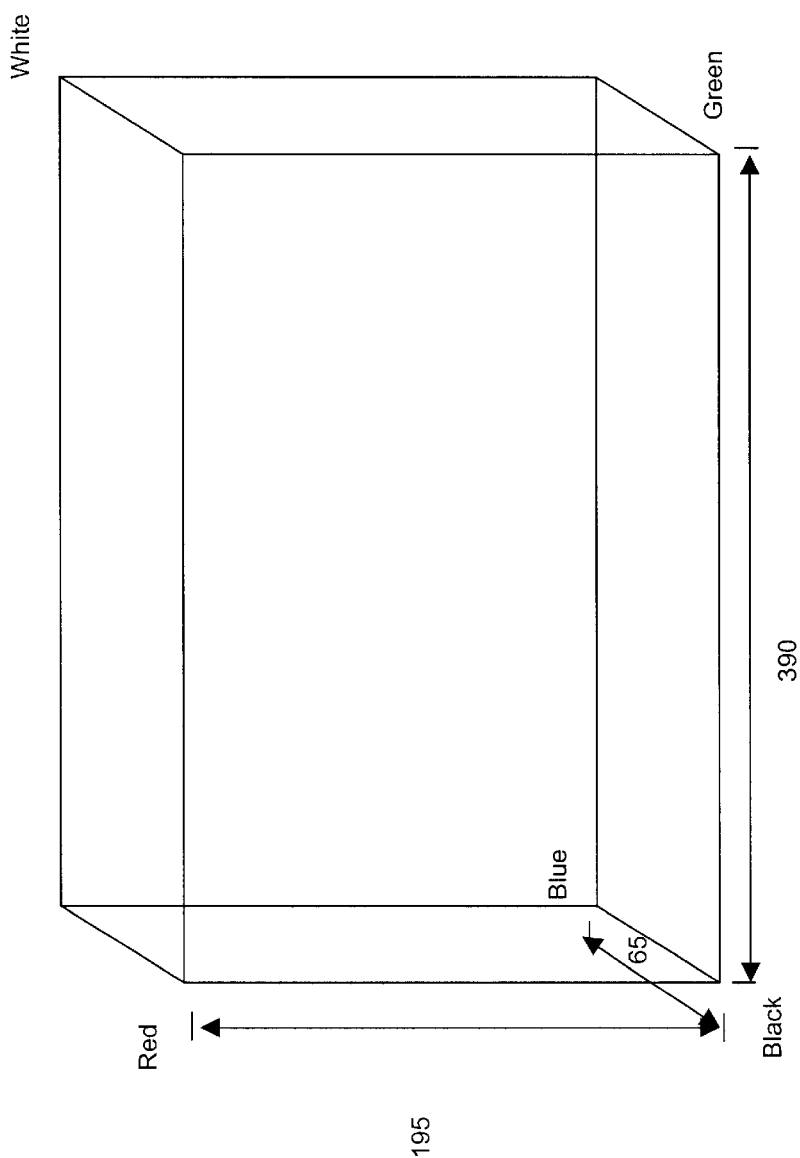
FIG. 5 depicts a simplified block diagram illustrating the relationship between the colors red, green and blue in a weighted red, green, blue color model.

As is well known to those skilled in the art, the human eye does not detect contrast between each of the three colors red, green and blue equally as compared to other colors such as black and white. Contrast is the degree of difference between light and dark extremes of color on a monitor or on printed output. For example, the human eye detects contrast between green and black to a greater degree than the human eye detects contrast between blue and black. Therefore, according to an exemplary embodiment of the present invention, the relative concentrations of red, green and black used to create and render colors are weighted to account for the ability of the human eye to detect contrast between those colors. As shown in FIG. 5, a three-dimensional representation of a red/green/blue color model is shown as weighted to account for the relative contrast between those colors as those contrasts are detected by the human eye. The contrast between red and black is set at 195, the contrast between black and green is set at 390, and the contrast between blue and black is set at 65. This configuration creates a weighted contrast ratio between the three colors as approximately six parts green to three parts red to one part blue. As illustrated in FIG. 5, red plus green plus blue results in white, and the contrast between white and black is still 443 units in the weighted model as in the un-weighted model illustrated in FIG. 4.

Using this configuration as a starting point for the computer software application 100 for creating colors using the red/green/blue model makes more it likely that the starting colors contained in the color table 310 will have or approach the required minimum contrast. For example, if the minimum contrast between green and black for use as a color pairing by the software application 100 is set to 80 units of contrast, then a color pairing comprised of green and black will exceed the required minimum contrast at the outset because the standard contrast distance between green and black according to the exemplary embodiment of the present illustrated in FIG. 5 is 390 units of contrast. On the other hand, if the starting color pairing is blue and black and the required minimum contrast is 80 units of contrast, the pairing of blue and black is adjusted according to the present invention because the starting separation is only 65 units of contrast between blue and black is less than the required minimum of 80 units.

According to an exemplary embodiment of the present invention, this model ensures that contrast between color pairings such as blue and black will be increased given the known fact that the human eye has difficulty detecting contrast between certain colors such as blue and black. It should be understood that the required minimum and maximum contrasts between given pairs of colors are determined by the developers of the software application 100 according to contrast levels found appealing and useful to the human eye.

Figure 6:
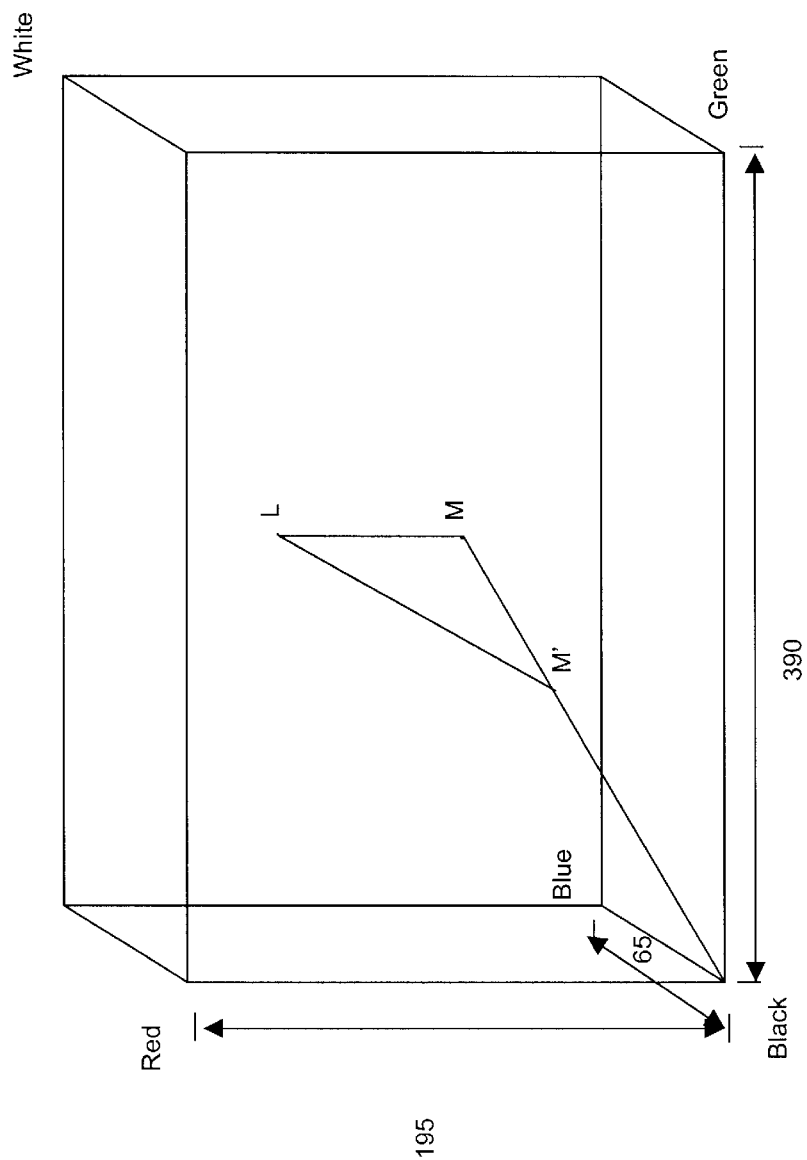
FIGS. 6, 7, 8 and 9 depict graphical representations of adjustment of contrast between a pair of colors according to an exemplary embodiment of the present invention.

Referring now to FIG. 6, in accordance with an exemplary embodiment of the present invention the contrast increasing/decreasing module 305 reads from minimum contrast table 320 a first graphical user interface element pairing and corresponding colors along with the corresponding minimum contrast between the two colors comprising that pair. It should be understood that each pair contained in the table is analyzed and adjusted, if necessary, by the contrast increasing/decreasing module 305 one at a time. If the two colors of a given pair of colors already have sufficient contrast, then that pair is designated as an acceptable pairing in terms of contrast and processing is continued to the next pairing of graphical user interfaces. If the color contrast between a given pair of graphical user interface elements is acceptable without modification, then both those colors are locked from subsequent movement where one of those graphical user interface elements is compared against a third element.

However, if the contrast between the two colors of a given pair is less than the minimum required contrast, the contrast increasing/decreasing module 305 increases the contrast between the two colors. The first color in the pair is designated as locked meaning that it cannot be modified by the contrast increasing/decreasing module 305. That is, the color, hue, brightness and color saturation are not modified for the locked color. The second color in the pairing is designated as moveable meaning that it may be changed by the contrast increasing/decreasing module 305 in order to increase the contrast between the two colors.

According to an exemplary embodiment of the present invention, the locked color L is plotted as a point in the weighted red/green/blue space, as illustrated in FIG. 6. The moveable color M is likewise plotted and contrast is calculated as the Cartesian distance between the locked color L and the moveable color M. If the moveable color M is closer to black than the locked color L, the moveable color is moved toward black to color M' such that the Cartesian distance between the locked color and the moveable color meets the minimum required contrast, for example 80 units of contrast. The calculation of distances between points plotted in a Cartesian coordinate system is well known to those skilled in the art of mathematics.

As set forth above, colors such as those designated as locked and moveable are rendered as mixtures of different percentages of red, green and blue under a typical red/green/blue color model. As is understood by those skilled in the art, given two arbitrary colors in red/green/blue space, contrast may be increased by simply by pulling the colors apart along a the line constructed by the two points defined by the colors. However, moving the colors apart along this line may result in undesirable changes in hue. That is, gray may become blue, purple may become red, and the like.

By moving one color toward white or black, as described above, contrast may be increased while minimizing the change in hue. Moving the moveable color closer to black, as shown in FIG. 6, increases the contrast between the locked color and the moveable color by decreasing the brightness of the moveable color. Moving the moveable color closer to white, as described below for FIG. 7, increases contrast by increasing the brightness of M. For example, the color red may go from dark red to a lighter red to increase its contrast with its paired color without changing the color blue to a different hue altogether. Accordingly, the goal of increasing contrast is achieved by altering the brightness of the color while minimizing alteration of the relative hues of the paired colors.

The designation of one color as locked and one color as moveable avoids three way dependencies in colored pairs. For example, given a required minimum contrast between colors A and B and the required minimum contrast between colors B and C, if A and B are both modified to get colors A' and B', and B' is then modified to color B" in order to fix its contrast with color C, there is no guarantee that color B" and color A' now have sufficient contrast. As set forth above, this problem is avoided in the present invention by designating a color as locked for one graphical user interface element as and keeping that color locked thereafter. After a moveable color is moved, then that color becomes locked in the new color location. In this way, after A' and B' are calculated, both become locked and cannot be changed in the future. In order to ensure proper contrast between B' and C, then, B' must be the locked color, and C must be the moveable color. Accordingly, subsequent color movements will not adversely affect the contrast between colors of graphical user interface elements previously fixed in accordance with the present invention.

Figure 7:
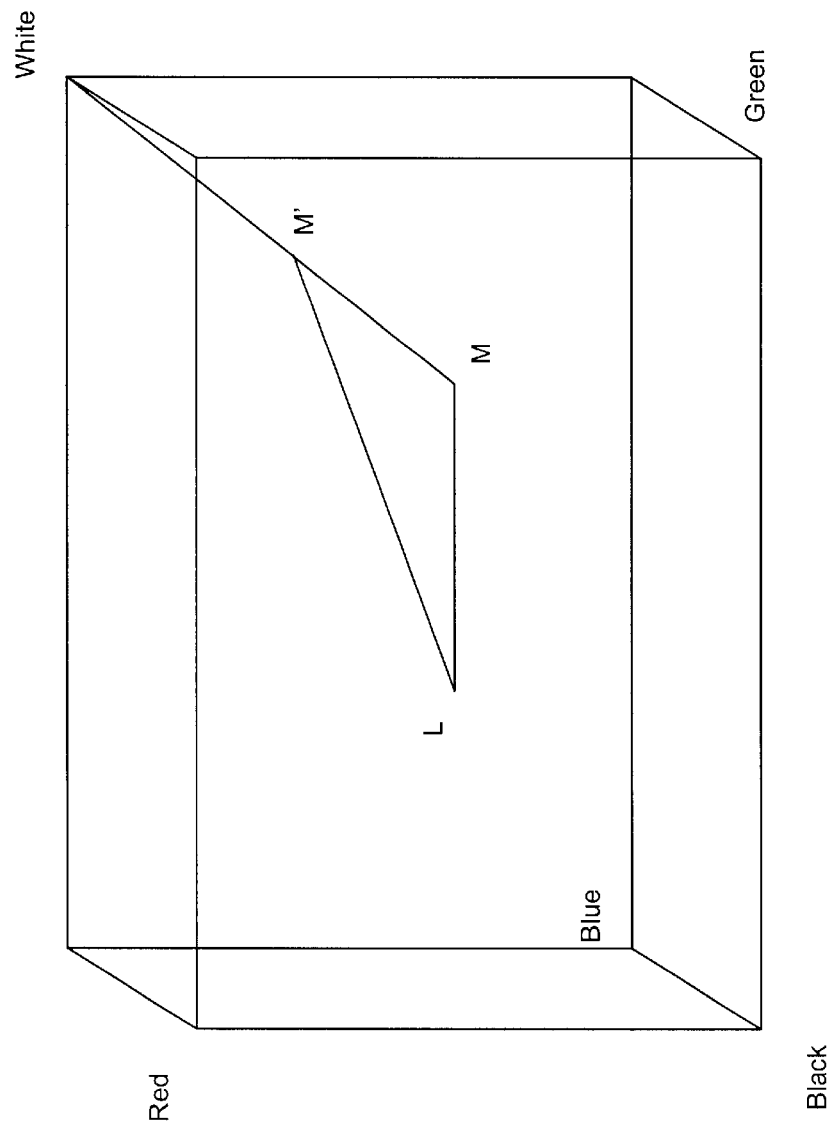

FIG. 7 represents the instance in which the moveable color M is closer to white than the locked color L. In this case, the moveable color is moved closer toward white to color M' such that the resulting Cartesian distance between the locked color L and the moveable color M' exceeds the minimum required contrast.

Figure 8:
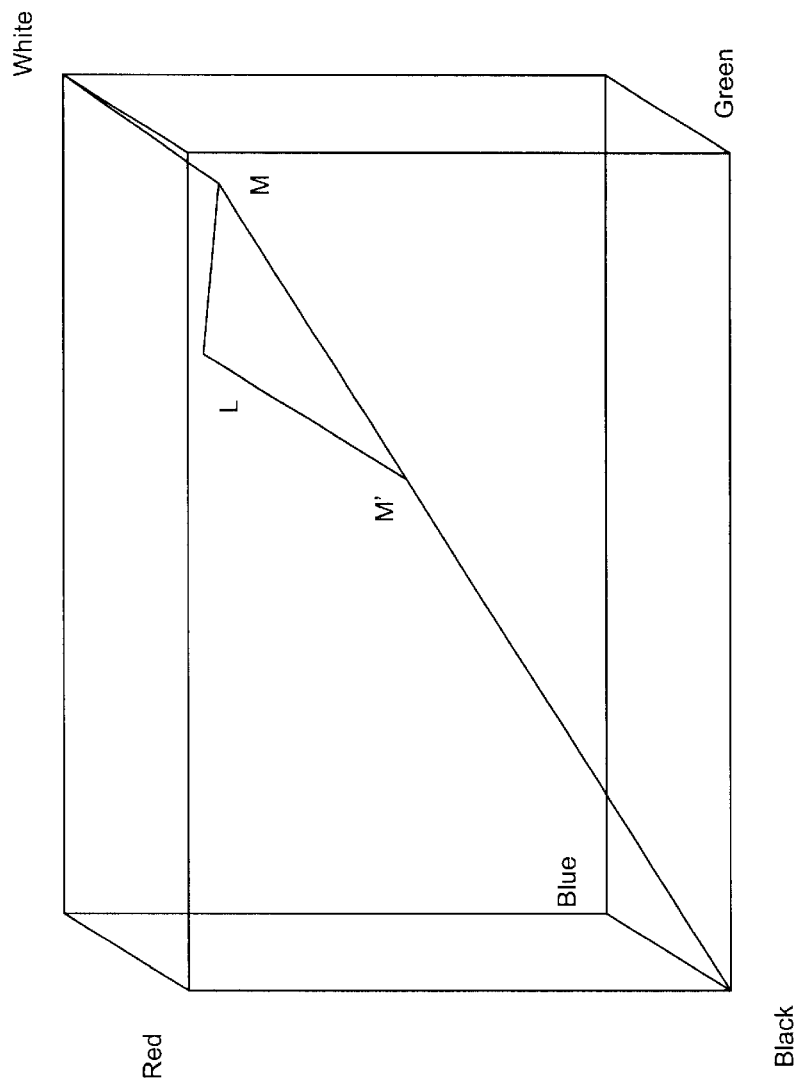

According to a preferred embodiment of the present invention, relative brightness of the moveable color and the locked color should not be exchanged, and the moveable color should be moved closer to white or to black, as described above. However, as shown in FIG. 8, exchanging the relative intensities of brightness of the locked color and the moveable colors may be required where the moveable color is closer to white than the locked color, but the contrast between white and the locked color is lower than the minimum required contrast for the pair. M would need to be moved past white in order to sufficiently contrast with L. This is not possible since the color must stay within in the color cube. Instead, in this instance, the moveable color M is moved toward black to color M' as shown in FIG. 8. Such a movement of the moveable color results in exchanging the relative intensities of the two original colors. Accordingly, by moving the moveable color relative to the locked color to position M', as shown in FIG. 8, the Cartesian distance between the locked color L and the moveable color M' exceeds the minimum required contrast between the locked color and the moveable color.

It will be appreciated by those skilled in the art that the opposite configuration to that illustrated in FIG. 8 may exist, requiring a similar treatment. That is, the locked color L and the moveable color M may be on the opposite end of the spectrum between white and black from that illustrated in FIG. 8, where L and M are both close to black without enough distance between M and black to move M to position M' to obtain the desired contrast. In such a case, M is moved past L toward white to obtain the desired contrast.

Figure 9:
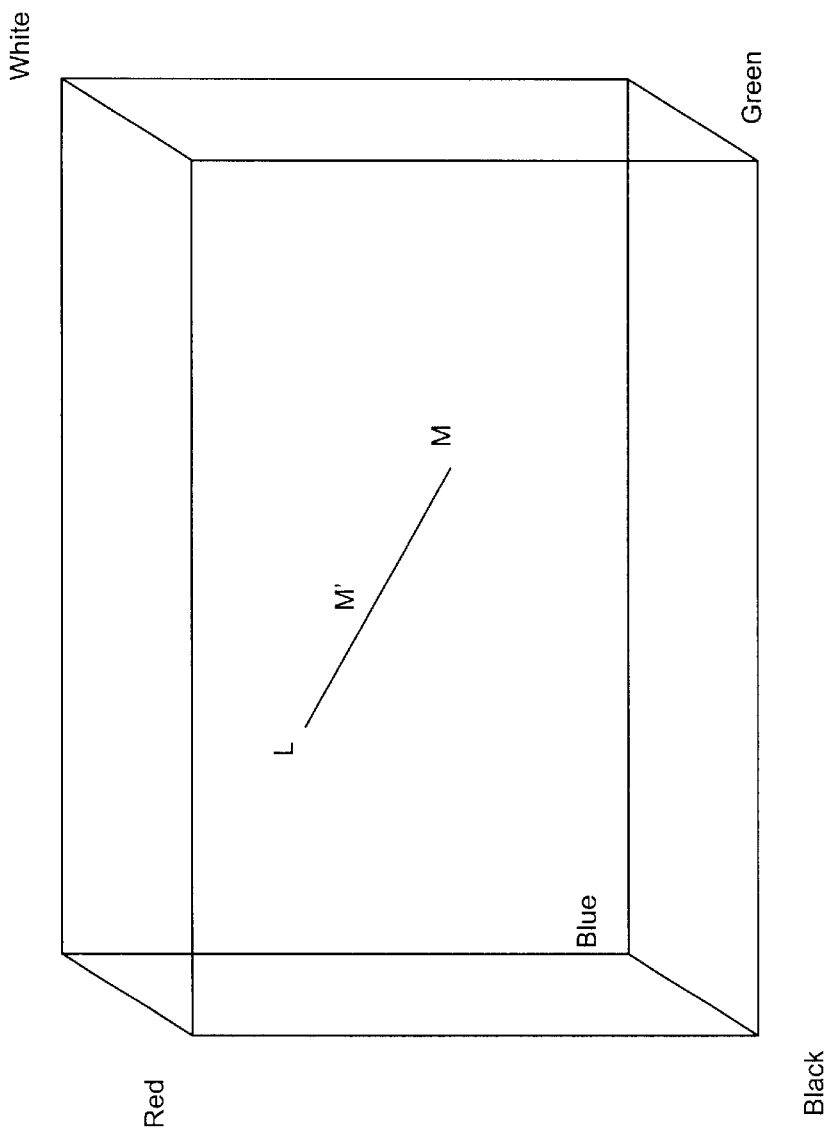

According to an exemplary embodiment of the present invention, some color pairings may exceed a maximum required contrast. For example, if the button 120, shown in FIG. 1, has been disabled by the user, it may be useful to change the contrast of the text "B" to indicate that the button has been disabled. If too much contrast exists between the text "B" and the background color 123, then users may not realize the button has been disabled. On the other hand, if not enough contrast exists between the color rendering the text "B" and the background color 123, then the text "B" may "washout" from the view of the user. As shown in FIG. 9, in this situation, the first color is designated as locked L and the second color is designated as moveable M. In order to decrease the contrast between the locked color and the moveable color, the moveable color is moved toward the locked color to color M' until the contrast between the moveable color and the locked color is less than the maximum required contrast.

As is well known to those skilled in the art, the human eye may more readily distinguish contrast near white than black. According to a preferred embodiment, minimum contrasts designated for each pair of colors in the minimum contrast table 310 are scaled based on how close the colors are to black. The closer the colors are to black the more the minimum contrast is dynamically increased. Scaling on the color parings is done at run time of the software application 100.

Figure 10:
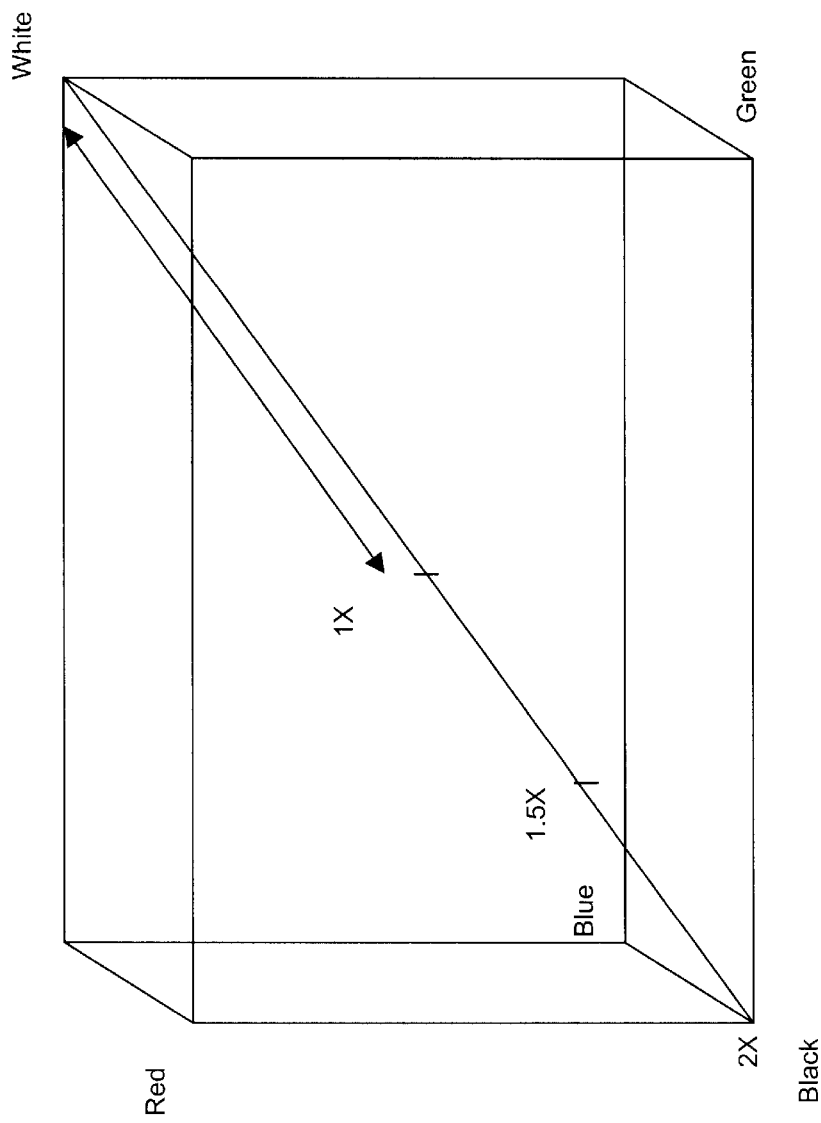
FIG. 10 depicts a graphical representation of a weighted contrast scale between the colors white and black according to an exemplary embodiment of the present invention.

As shown in FIG. 10, for locked colors lying between the mid-point of the scale between black and white and the white end of the scale their minimum contrast is scaled. However, as locked colors approach the black end of the scale, the minimum contrast is scaled such that the minimum contrast at the black end of the scale is increased by a factor of two over a minimum contrast for color pairings existing at the mid point of the scale and the white end of the scale.

Figure 11:
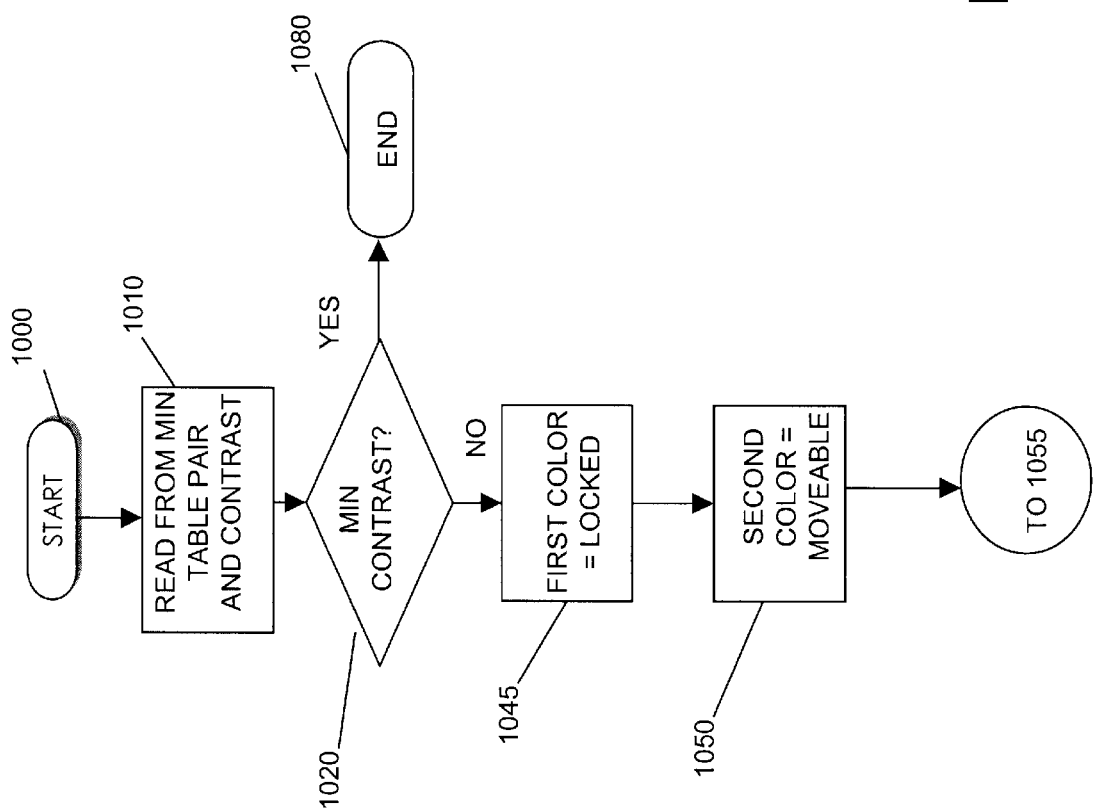
FIGS. 11 and 12 illustrate an exemplary method for adjusting the contrast between a pair of colors according to an exemplary embodiment of the present invention.
Figure 12:
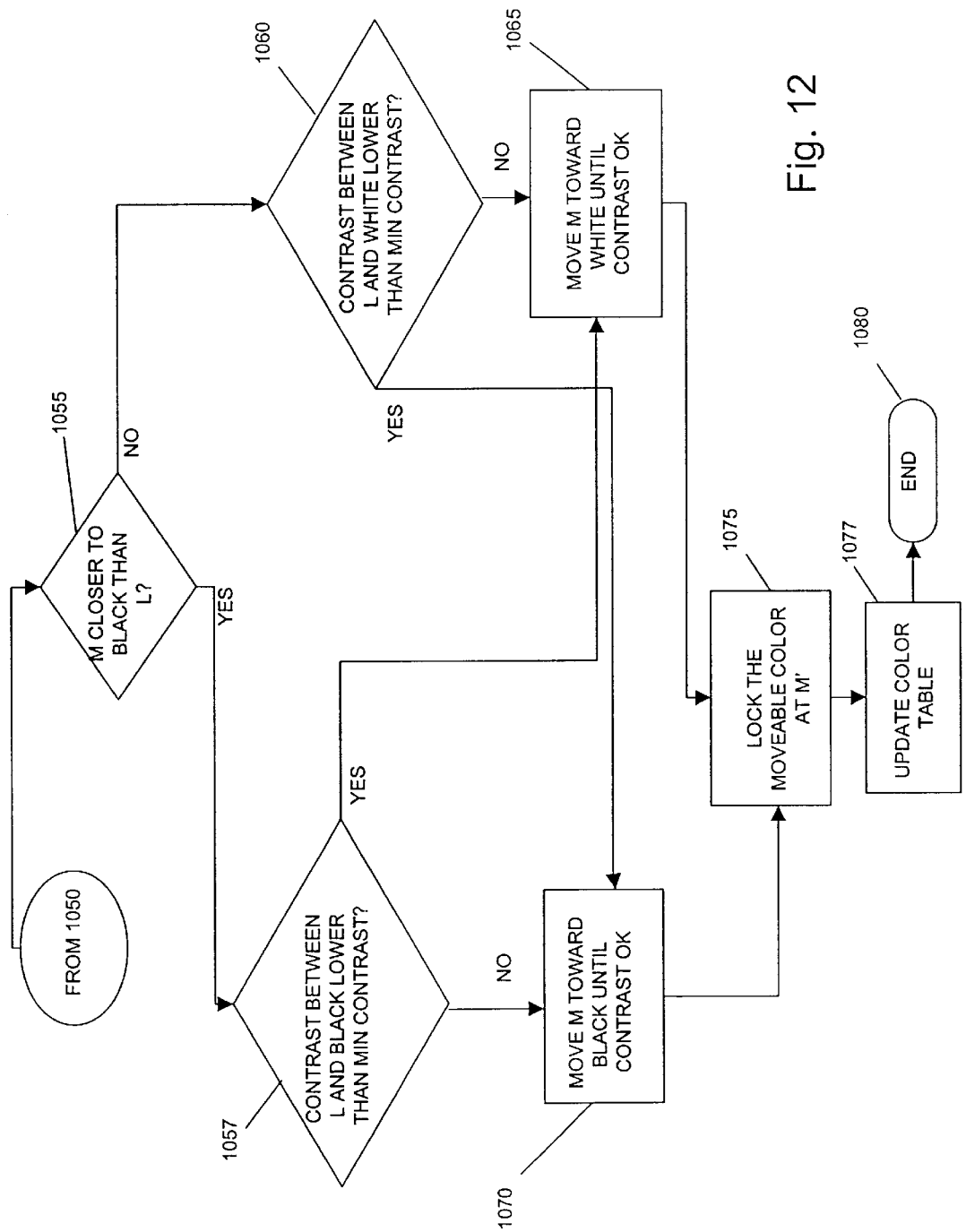

It is advantageous to describe an exemplary embodiment of the present invention by way of an exemplary analysis and adjustment, if necessary, of one or more graphical user interface element pairings at run time of the software application 100, illustrated in FIG. 1. FIGS. 11 and 12 illustrate an exemplary method for adjusting the contrast between pairs of graphical user interface elements according to an exemplary embodiment of the present invention. The following description of FIGS. 11 and 12 is done in terms of exemplary graphical user interface elements pairing selected from the minimum contrast table 320 and the maximum contrast table 330 for use in rendering the exemplary screen shot 105, illustrated in FIG. 1. At step 1000, the process begins and proceeds to step 1010. At step 1010, the contrast increasing/decreasing module 305 reads the first graphical user interface element pairing, Button Background/Button Text (Green/Red), along with the minimum contrasts for that color pairing from the minimum contrast table 320.

After the first pairing is read from the minimum contrast table 320, the method proceeds to step 1020, and a determination is made as to whether the colors of the graphical user interface element pairing selected for use by the software application 100 have the minimum required contrast shown for the pairing in the minimum contrast table 320 (after the minimum contrast has been scaled based on these particular colors). If at step 1020 the pairing selected for use by the software application 100 does not have the minimum required contrast between the colors, for example red and green, the method moves to step 1045, and the first color, green in this example, is designated as the locked color L and is plotted as shown in FIG. 6. According to a preferred embodiment, the locked and moveable colors are selected by the developer of the software application 100. At step 1050 the second color, red in this example, is designated as the moveable color M and is plotted relative to the locked color L as shown in FIG. 6.

The method then proceeds to step 1055, shown in FIG. 12, where a determination is made as to whether the moveable color M is closer to black than the locked color L. If the moveable color is closer to black than the locked color, as illustrated in FIG. 6, the method proceeds along the "Yes" branch to step 1057. At step 1057, a determination is made as to whether the contrast between the locked color and black is lower than the minimum contrast. If so, the method proceeds along the "Yes" branch to step 1065 for processing as discussed below. If not, the method follows the "No" branch to step 1070, and the moveable color is moved toward black to color M' until the contrast between the locked color L and the moveable color M' exceeds the minimum required contrast for the pairing shown in the color pairings table 310. At step 1075, the moveable color is locked at the new position M', as illustrated in FIG. 6. At step 1077, the color table 310 is updated with the locked color L and the moveable color M'. The method then proceeds to step 1080 and ends.

If at step 1055 the moveable color M is closer to white than the locked color, as illustrated in FIG. 7, the method proceeds along the "No" branch to step 1060. At step 1060, a determination is made as to whether the contrast between the white end of the scale and the locked color is lower than the minimum contrast for the pair as illustrated in FIG. 8. If at step 1060 a determination is made that the contrast between the white end of the scale and the locked color is lower than the minimum contrast required for the pair, the method proceeds along the "Yes" branch to step 1070, and the moveable color M is moved past the locked color position toward black until the contrast between the locked color L and the moveable color M' exceeds the minimum required contrast, as is illustrated in FIG. 8.

However, if at step 1060 the moveable color is closer to white than the locked color, as illustrated in FIG. 7, and the contrast between the locked color and the white end of the scale is higher than the minimum contrast between the color pair at issue, the method proceeds to step 1065, and the moveable color M is moved toward the white end of the scale to position M' such that the Cartesian distance between the locked color L and the color M' is greater than the minimum contrast between the color pairing. At step 1075, the moveable color is locked at the new position M', as illustrated in FIG. 5. As set forth above, at step 1075, the moveable color is locked at the new position M', as illustrated in FIG. 6. At step 1077, the color table 310 is updated with the locked color L and the moveable color M'. The method then proceeds to step 1080 and ends.

Figure 13:
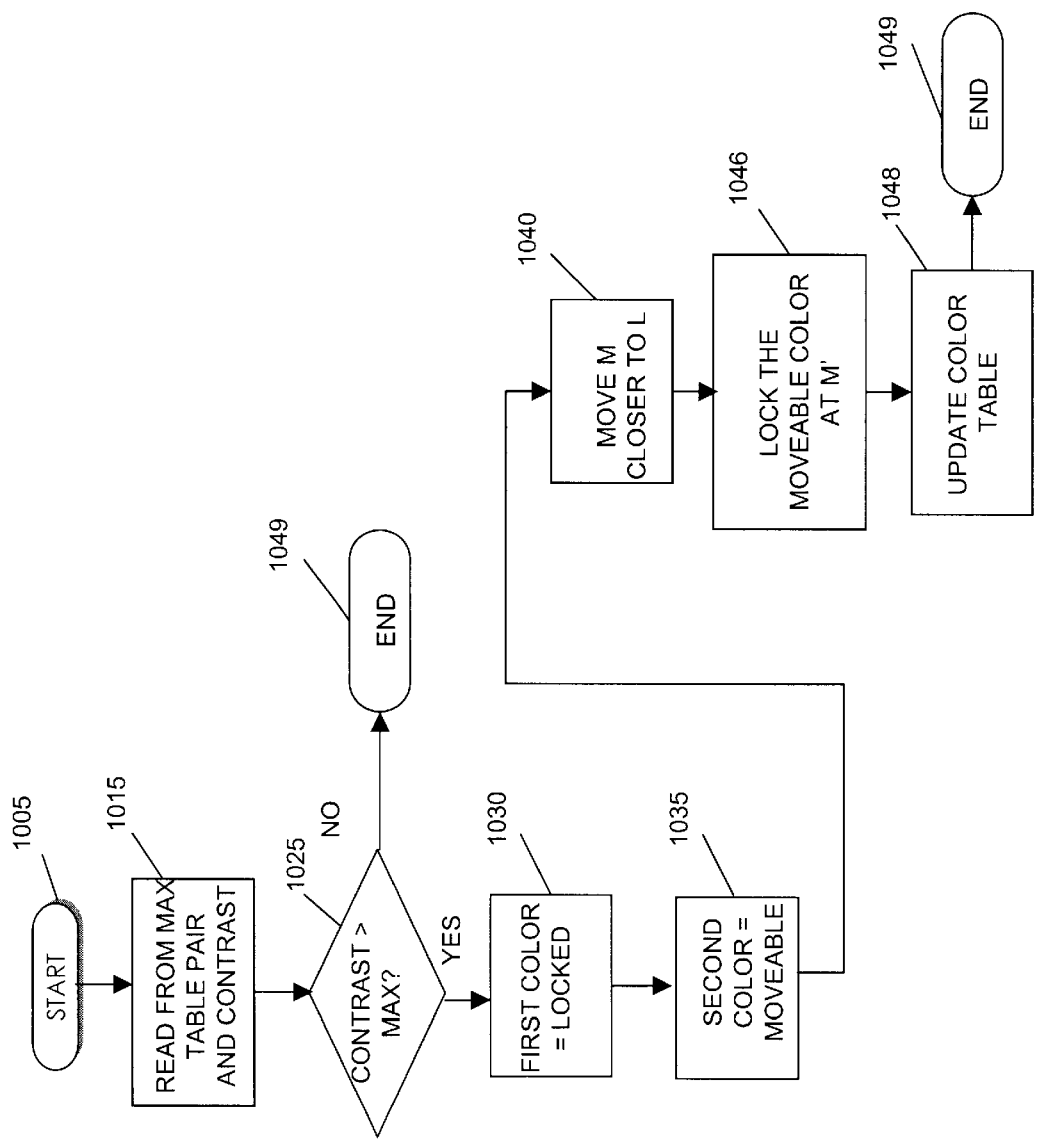
FIG. 13 illustrates an exemplary method for creating a maximum contrast table for ensuring the contrast between a pair of colors does not exceed a maximum contrast according to an exemplary embodiment of the present invention.

FIG. 13 illustrates an exemplary method for creating a maximum contrast table, as described above with reference to FIGS. 3 and 9, for ensuring the contrast between a pair of colors does not exceed a maximum contrast. After all element pairings in the minimum contrast table 320 have been processed, as described above with reference to FIGS. 11 and 12, the method and system of the present invention processes the maximum contrast table 330. The method begins at step 1015, and the first pair of elements in the maximum contrast table 330 is obtained for processing.

At step 1025, a determination is made as to whether the contrast between the pairing exceeds the maximum contrast set out for the pairing in the maximum contrast table 330. If the maximum contrast is not exceeded, then the method moves to step 1049 and ends. However, if the contrast between the colors comprising the color pairing in question exceeds the maximum contrast, the method moves along the "Yes" branch to step 1030, and the first color is designated as locked. The locked color is plotted, as shown in FIG. 9. At step 1035, the second color is designated as moveable and is plotted, as shown in FIG. 9. As for the minimum contrast table 310, described above, according to a preferred embodiment, the locked and moveable colors are selected by the developer of the software application 100.

At step 1040, the moveable color is moved on a line between the moveable color and the locked color to M' until the contrast between the moveable color M' and the locked color is less than the maximum allowed contrast between the two colors. At step 1046, the moveable color is locked at the new position M', as illustrated in FIG. 9. At step 1048, the color table 310 is updated with the locked color L and the moveable color M'. The method then ends at step 1049.

It should be understood that under any of the situations described above, after the moveable color is moved to achieve the required contrast between the two colors comprising the color pairing, the color pairing is then designated for use by the software application 100 for rendering graphical user interface elements and text as shown in FIG. 1. The steps described with respect to FIGS. 11 and 12 are performed for each pairing listed in the minimum and maximum contrast tables 320 and 330 at run time of the software application 100. If the user desires to change the colors provided by the user's computer operating system, the user can make changes to the color set provided by the computer operating system and the method and system of the present invention dynamically runs comparisons of all graphical user interface element pairings contained in the minimum and maximum contrast tables 320 and 330 and adjusts respective contrasts as required.

As described above, once a color for a given graphical user interface element is designated as locked, the color for that graphical user interface element will remain locked when comparing that graphical user interface element with other graphical user interface elements. And, after the color of a graphical user interface element is designated as moveable, and is moved, that color for that graphical user interface element is locked from subsequent change as compared to other graphical user interface elements. This prevents the undesirable effect of making subsequent changes that adversely affect previously modified color contrasts.

It will be apparent to those skilled in the art that various modifications or variations can be made in the present invention without departing from the scope or spirit of the invention. Other embodiments of the invention will be apparent to those skilled in the art from consideration of the specification and practice of the invention disclosed herein. It is intended that the specification be considered as exemplary only, with a true scope and spirit of the invention being indicated by the following claims.

What is claimed is:

1. A method of ensuring adequate color contrast between graphical user interface elements, comprising the steps of:
   receiving a first pair of graphical user interface elements;
   receiving a first color of a first graphical user interface element of the pair of graphical user interface elements;
   receiving a second color of a second graphical user interface element of the pair of graphical user interface elements;
   setting a minimum contrast between the first color and the second color;
   determining whether a contrast between the first color and the second color is equal to or greater than the minimum contrast;
   if the contrast is not equal to or greater than the minimum contrast, designating the first color as locked, and designating the second color as moveable;
   determining which of the locked color or the moveable color is closer to the color black;
   determining which of the locked color or the moveable color is closer to the color white;
   if the moveable color is closer to the color black than the locked color, moving the moveable color closer to the color black until the contrast between the first color and the second color is equal to or greater than the minimum contrast; and
   if the moveable color is closer to the color white than the locked color, moving the moveable color closer to white until the contrast between the first color and the second color is equal to or greater than the minimum contrast.

2. The method of claim 1, further comprising the step of:
   if the moveable color is closer to the color white than the locked color, but the contrast between the locked color and the color white is less than the minimum contrast, moving the moveable color closer to the color black until the contrast between the locked color and the moveable color is equal to or greater than the minimum contrast.

3. The method of claim 1, further comprising the step of:
   if the moveable color is closer to the color black than the locked color, but the contrast between the locked color and the color black is less than the minimum contrast, moving the moveable color closer to the color white until the contrast between the locked color and the moveable color is equal to or greater than the minimum contrast.

4. The method of claim 1, further comprising the steps of:
   setting a maximum contrast between the first color and the second color;
   determining whether the contrast between the first color and the second color is greater than the maximum contrast; and
   moving the moveable color closer to the locked color until the contrast between the locked color and the moveable color is less than or equal to the maximum contrast.

5. The method of claim 1, further comprising the steps of:
   once the locked color is designated as locked for the first graphical user interface element of the pair of graphical user interface elements, locking the color of the first graphical user interface element from subsequent modification; and
   once the moveable color is moved, locking the color of the second graphical user interface element from subsequent modification.

6. The method of claim 5, further comprising the steps of:
   receiving a second pair of graphical user interface elements, the second pair including the first graphical user interface element of the first pair of graphical user interface elements and a third graphical user interface element;
   receiving a third color of the third graphical user interface element;

determining whether a contrast between the first color and the third color is equal to or greater than a minimum contrast between the first color and the third color;

if the contrast between the first color and the third color is not equal to or greater than the minimum contrast between the first color and the third color, maintaining the first color as locked, and designating the third color as a second moveable color;

if the second moveable color is closer to the color black than the locked color, moving the second moveable color closer to the color black until the contrast between the first color and the second movable color is equal to or greater than the minimum contrast between the first color and the third color; and if the second moveable color is closer to the color white than the locked color, moving the second moveable color closer to white until the contrast between the first color and the second moveable color is equal to or greater than the minimum contrast between the first color and the third color.

7. A method of ensuring adequate color contrast between graphical user interface elements, comprising the steps of:

receiving a first pair of graphical user interface elements;

receiving a first color of a first graphical user interface element of the pair of graphical user interface elements;

receiving a second color of a second graphical user interface element of the pair of graphical user interface elements;

setting a minimum contrast between the first color and the second color;

determining whether a contrast between the first color and the second color is equal to or greater than the minimum contrast;

if the contrast is not equal to or greater than the minimum contrast, designating the first color as locked, and designating the second color as moveable; and if the moveable color is closer to the color black than the locked color, moving the moveable color closer to the color black until the contrast between the first color and the second color is equal to or greater than the minimum contrast.

8. The method of claim 7, further comprising the step of:

if the moveable color is closer to the color white than the locked color, moving the moveable color closer to white until the contrast between the first color and the second color is equal to or greater than the minimum contrast.

9. The method of claim 7, further comprising the step of:

if the moveable color is closer to the color white than the locked color, but the contrast between the locked color and the color white is less than the minimum contrast, moving the moveable color closer to the color black until the contrast between the locked color and the moveable color is equal to or greater than the minimum contrast.

10. The method of claim 7, further comprising the step of:

if the moveable color is closer to the color black than the locked color, but the contrast between the locked color and the color black is less than the minimum contrast, moving the moveable color closer to the color white until the contrast between the locked color and the moveable color is equal to or greater than the minimum contrast.

11. The method of claim 7, further comprising the steps of:

setting a maximum contrast between the first color and the second color;

determining whether the contrast between the first color and the second color is greater than the maximum contrast; and moving the moveable color closer to the locked color until the contrast between the locked color and the moveable color is less than or equal to the maximum contrast.

12. A computer readable medium having stored thereon computer-executable instructions which when executed by a computer, perform the steps of:

receiving a first pair of graphical user interface elements;

receiving a first color of a first graphical user interface element of the pair of graphical user interface elements;

receiving a second color of a second graphical user interface element of the pair of graphical user interface elements;

determining whether a contrast between the first color and the second color is equal to or greater than a minimum contrast between the first color and the second color;

if the contrast is not equal to or greater than the minimum contrast, designating the first color as locked, and designating the second color as moveable; and if the moveable color is closer to the color black than the locked color, moving the moveable color closer to the color black until the contrast between the first color and the second color is equal to or greater than the minimum contrast.

13. The computer readable medium of claim 12 having stored thereon computer-executable instructions which when executed by a computer, further perform the step of:

if the moveable color is closer to the color white than the locked color, moving the moveable color closer to white until the contrast between the first color and the second color is equal to or greater than the minimum contrast.

14. The computer readable medium of claim 12 having stored thereon computer-executable instructions which when executed by a computer, further perform the step of:

if the moveable color is closer to the color white than the locked color, but the contrast between the locked color and the color white is less than the minimum contrast, moving the moveable color closer to the color black until the contrast between the locked color and the moveable color is equal to or greater than the minimum contrast.

15. The computer readable medium of claim 12 having stored thereon computer-executable instructions which when executed by a computer, further perform the step of:

if the moveable color is closer to the color black than the locked color, but the contrast between the locked color and the color black is less than the minimum contrast, moving the moveable color closer to the color white until the contrast between the locked color and the moveable color is equal to or greater than the minimum contrast.

16. The computer readable medium of claim 12 having stored thereon computer-executable instructions which when executed by a computer, further perform the steps of:

setting a maximum contrast between the first color and the second color;

determining whether the contrast between the first color and the second color is greater than the maximum contrast; and moving the moveable color closer to the locked color until the contrast between the locked color and the moveable color is less than or equal to the maximum contrast.

17. A system of ensuring adequate color contrast between graphical user interface elements comprising a computer program module operative:
- to receive a first pair of graphical user interface elements;
- to receive a first color of a first graphical user interface element of the pair of graphical user interface elements;
- to receive a second color of a second graphical user interface element of the pair of graphical user interface elements;
- to set a minimum contrast between the first color and the second color;
- to determine whether a contrast between the first color and the second color is equal to or greater than the minimum contrast;
- if the contrast is not equal to or greater than the minimum contrast, to designate the first color as locked, and to designate the second color as moveable; and
- if the moveable color is closer to the color black than the locked color, to move the moveable color closer to the color black until the contrast between the first color and the second color is equal to or greater than the minimum contrast.

18. The computer program module of claim 17 further operative:
- if the moveable color is closer to the color white than the locked color, to move the moveable color closer to white until the contrast between the first color and the second color is equal to or greater than the minimum contrast.

19. The computer program module of claim 17 further operative:
- if the moveable color is closer to the color white than the locked color, but the contrast between the locked color and the color white is less than the minimum contrast, to move the moveable color closer to the color black until the contrast between the locked color and the moveable color is equal to or greater than the minimum contrast.

20. The computer program module of claim 17 further operative:
- if the moveable color is closer to the color black than the locked color, but the contrast between the locked color and the color black is less than the minimum contrast, to move the moveable color closer to the color white until the contrast between the locked color and the moveable color is equal to or greater than the minimum contrast.

21. The computer program module of claim 17 further operative:
- to set a maximum contrast between the first color and the second color;
- to determine whether the contrast between the first color and the second color is greater than the maximum contrast; and
- to move the moveable color closer to the locked color until the contrast between the locked color and the moveable color is less than or equal to the maximum contrast.

22. A method of ensuring adequate contrast between two colors, comprising the steps of:
- receiving a first color and a second color;
- setting a minimum contrast between the first color and the second color;
- determining whether a contrast between the first color and the second color is equal to or greater than the minimum contrast;
- if the contrast is not equal to or greater than the minimum contrast, designating the first color as locked, and designating the second color as moveable; and
- if the moveable color is closer to white than the locked color, moving the moveable color closer to white until the contrast between the first color and the second color is equal to or greater than the minimum contrast.

23. The method of claim 22, further comprising the step of:
- if the moveable color is closer to the color black than the locked color, moving the moveable color closer to the color black until the contrast between the first color and the second color is equal to or greater than the minimum contrast.

24. The method of claim 22, further comprising the step of:
- if the moveable color is closer to the color white than the locked color, but the contrast between the locked color and the color white is less than the minimum contrast, moving the moveable color closer to the color black until the contrast between the locked color and the moveable color is equal to or greater than the minimum contrast.

25. The method of claim 22, further comprising the steps of:
- setting a maximum contrast between the first color and the second color;
- determining whether the contrast between the first color and the second color is greater than the maximum contrast; and
- moving the moveable color closer to the locked color until the contrast between the locked color and the moveable color is less than or equal to the maximum contrast.

26. A method of ensuring adequate contrast between pairs of colors, comprising the steps of:
- receiving a first pair of colors;
- receiving a first color and a second color of the first pair of colors;
- determining whether a contrast between the first color and the second color is equal to or greater than a minimum contrast;
- if the contrast is not equal to or greater than the minimum contrast, designating the first color as locked, and designating the second color as moveable;
- if the moveable color is closer to the color black than the locked color, moving the moveable color closer to the color black until the contrast between the first color and the second color is equal to or greater than the minimum contrast; and
- if the moveable color is closer to the color white than the locked color, moving the moveable color closer to white until the contrast between the first color and the second color is equal to or greater than the minimum contrast.

27. The method of claim 26, further comprising the step of:
- if the moveable color is closer to the color white than the locked color, but the contrast between the locked color and the color white is less than the minimum contrast, moving the moveable color closer to the color black until the contrast between the locked color and the moveable color is equal to or greater than the minimum contrast.

28. The method of claim 26, further comprising the step of:

if the moveable color is closer to the color black than the locked color, but the contrast between the locked color and the color black is less than the minimum contrast, moving the moveable color closer to the color white until the contrast between the locked color and the moveable color is equal to or greater than the minimum contrast.

29. The method of claim 26, further comprising the steps of:

determining whether the contrast between the first color and the second color is greater than a maximum contrast; and moving the moveable color closer to the locked color until the contrast between the locked color and the moveable color is less than or equal to the maximum contrast.

30. The method of claim 26, further comprising the steps of:

once the locked color is designated as locked for the first pair of colors, locking the first color from subsequent modification; and once the moveable color is moved, locking the second color from subsequent modification.

31. The method of claim 26, further comprising the steps of:

receiving a second pair of colors, the second pair including the first color of the first pair of colors and a third color;

determining whether a contrast between the first color and the third color is equal to or greater than a minimum contrast between the first color and the third color;

if the contrast is not equal to or greater than the minimum contrast between the first color and the third color, maintaining the first color as locked, and designating the third color as a second moveable color;

if the second moveable color is closer to the color black than the locked color, moving the second moveable color closer to the color black until the contrast between the first color and the second movable color is equal to or greater than the minimum contrast; and if the second moveable color is closer to the color white than the locked color, moving the second moveable color closer to white until the contrast between the first color and the second moveable color is equal to or greater than the minimum contrast.

* * * * *

UNITED STATES PATENT AND TRADEMARK OFFICE
CERTIFICATE OF CORRECTION

PATENT NO.    : 6,636,228 B1
DATED         : October 21, 2003
INVENTOR(S)   : Morton et al.

It is certified that error appears in the above-identified patent and that said Letters Patent is hereby corrected as shown below:

<u>Title page,</u>
Item [*] Notice, delete "286 days" and insert -- 287 days --.

<u>Column 3,</u>
Line 64, delete "ran" and insert -- run --.

Signed and Sealed this

Ninth Day of March, 2004

JON W. DUDAS
*Acting Director of the United States Patent and Trademark Office*